US012761525B2

(12) United States Patent
Sasaki et al.

(10) Patent No.: US 12,761,525 B2
(45) Date of Patent: Oct. 13, 2026

(54) LENS APPARATUS, IMAGE PICKUP APPARATUS, METHOD OF CONTROLLING LENS APPARATUS AND PROGRAM

(71) Applicant: CANON KABUSHIKI KAISHA, Tokyo (JP)

(72) Inventors: Kunihiko Sasaki, Tochigi (JP); Toshihiro Okuda, Tochigi (JP); Takehiko Sato, Tochigi (JP); Tadanori Okada, Tochigi (JP); Shu Ito, Tochigi (JP); Toshimune Nagano, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 782 days.

(21) Appl. No.: 17/725,908

(22) Filed: Apr. 21, 2022

(65) Prior Publication Data

US 2022/0350222 A1 Nov. 3, 2022

(30) Foreign Application Priority Data

Apr. 28, 2021 (JP) ................................. 2021-075917

(51) Int. Cl.
*G03B 5/02* (2021.01)
*G01D 5/26* (2006.01)
(Continued)

(52) U.S. Cl.
CPC ............... *G03B 5/02* (2013.01); *G02B 7/021* (2013.01); *G02B 7/04* (2013.01); *G03B 13/34* (2013.01); *G01D 5/264* (2013.01)

(58) Field of Classification Search
CPC .......... G03B 5/02; G03B 13/34; G02B 13/34; G02B 7/021; G02B 7/04; G01D 5/264
(Continued)

(56) References Cited

U.S. PATENT DOCUMENTS 6,965,733 B1 * 11/2005 Nomura ............... G02B 15/143 396/75
7,099,576 B2 * 8/2006 Hamasaki .............. G02B 7/102 359/823
(Continued)

FOREIGN PATENT DOCUMENTS

JP 2006322984 A 11/2006
JP 2008197617 A 8/2008
(Continued)

*Primary Examiner* — Pinping Sun
*Assistant Examiner* — Andrew R Wright
(74) *Attorney, Agent, or Firm* — ROSSI, KIMMS & McDOWELL LLP

(57) ABSTRACT

A lens apparatus is provided with movable first and second units, first and second holders for holding the first and second units, a driving unit for electrically driving the second holder, a transmission member movable relative to the second holder in the optical axis direction and transmits driving force to the second holder, a biasing member for biasing the second holder toward the first holder side relative to the transmission member, a controller for controlling the driving unit, and first and second detectors for detecting the positions of the first and second holders, wherein movable ranges of the first and second holders have interference region which interfere with each other, and controller changes a control of driving unit between the interference region where the first and the second holding members interfere each other and an interference-free region based on detection results of the first and second detectors.

14 Claims, 9 Drawing Sheets

(51) Int. Cl.
*G02B 7/02* (2021.01)
*G02B 7/04* (2021.01)
*G03B 13/34* (2021.01)

(58) Field of Classification Search
USPC .......................................................... 359/409
See application file for complete search history.

(56) References Cited

U.S. PATENT DOCUMENTS

| | | | | |
|---|---|---|---|---|
| 7,675,696 | B2 * | 3/2010 | Asano | G02B 7/102 359/819 |
| 7,684,685 | B2 * | 3/2010 | Takahashi | G03B 5/02 348/208.99 |
| 9,294,658 | B2 * | 3/2016 | Adachi | G03B 3/10 |
| 10,379,314 | B2 * | 8/2019 | Honsho | F16C 11/0614 |
| 2008/0259466 | A1 * | 10/2008 | Avital | G02B 7/005 356/498 |
| 2011/0002679 | A1 * | 1/2011 | Noto | G03B 13/34 396/95 |
| 2012/0063014 | A1 * | 3/2012 | Terahara | G02B 7/08 359/813 |
| 2020/0348506 | A1 * | 11/2020 | Nishihara | G02B 7/04 |
| 2021/0021211 | A1 * | 1/2021 | Morita | H02N 2/06 |

FOREIGN PATENT DOCUMENTS

| | | | | |
|---|---|---|---|---|
| JP | 2010145503 | A | | 7/2010 |
| JP | 2012145873 | A | * | 8/2012 |
| JP | 2017227825 | A | | 12/2017 |
| JP | 2018081208 | A | | 5/2018 |
| WO | 2012077257 | A1 | | 6/2012 |

* cited by examiner

LENS APPARATUS, IMAGE PICKUP APPARATUS, METHOD OF CONTROLLING LENS APPARATUS AND PROGRAM

BACKGROUND OF THE INVENTION

Field of the Invention

The present invention relates to a lens apparatus, an image pickup apparatus, a method of controlling the lens apparatus and a program.

Description of the Related Art

A technique for allowing a lens unit that is moved manually or by a driving unit to enter a movable range of a lens unit that is moved by an electric external driving unit is known in order to shorten the shortest total length of a zoom lens barrel. Japanese Patent Application Laid-Open No. 2008-197617 discloses a lens apparatus which includes a first lens unit that is manually moved in the optical axis direction, and a second lens unit that is moved by a driving force of a driving member through a transmission member. Japanese Patent Application Laid-Open No. 2008-197617 also discloses a lens barrel structure which absorbs an impact of collision between lens units by displacing a biasing member when a second holding member holding the second lens unit interferes with a first holding member.

Further, Japanese Patent Application Laid-Open No. 2017-227825 proposes a method of changing the control of a stepping motor that is a driving member in order to prevent the feedback control from becoming unstable when a biasing member is displaced.

As described above, in the configuration in which a lens unit that is moved manually or by an external driving unit enters a moving range of a lens unit that is moved by an electric driving unit, a retreat structure by a biasing member is adopted as disclosed in Japanese Patent Application Laid-Open No. 2008-197617. On the other hand, neither Japanese Patent Application Laid-Open No. 2008-197617 nor Japanese Patent Application Laid-Open No. 2017-227825 discloses a structure in which a lens unit enters a movable range of another lens unit without a retraction structure.

SUMMARY OF THE INVENTION

The present invention provides a compact lens apparatus that achieves improved driving accuracy and improved image pickup quality in a lens apparatus where a movable range of an electrically driven lens unit and a lens unit that is moved manually or by an external driving unit overlap each other.

A lens apparatus of the present invention includes: a first lens unit configured to move manually or by an external driving unit in an optical axis direction; a second lens unit configured to move in the optical axis direction; a first holding member configured to hold the first lens unit; a second holding member configured to hold the second lens unit; a driving unit configured to electrically drive the second holding member in the optical axis direction; a transmission member that is movable relative to the second holding member in a predetermined range in the optical axis direction and configured to transmit a driving force of the driving unit to the second holding member; a biasing member for biasing the second holding member toward a side of the first holding member with respect to the transmission member; a controller that controls driving unit; a first detecting unit that detects a position of the first holding member; and a second detecting unit that directly or indirectly detects a relative position of the second holding member relative to the first holding member, in which a movable range of the first holding member and a movable range of the second holding member have an interference range where the first holding member and the second holding member interfere with each other, in which the predetermined range in which the transmission member is movable relative to the second holding member in the optical axis direction is greater than a maximum length of the interference region in the optical axis direction, and in which the controller changes, based on detection results of the first detecting unit and second detecting unit, a control method of the driving unit between the interference region where the first holding member and the second holding member are in contact with each other and an interference-free region where the first holding member and the second holding member are not in contact with each other.

Further features of the present invention will become apparent from the following description of exemplary embodiments with reference to the attached drawings.

DESCRIPTION OF THE EMBODIMENTS

A preferred embodiment of the present invention will now be described in detail with reference to the accompanying drawings. In the explanatory drawing, the scale may be different from the actual scale for the sake of clarity.

Figure 1:
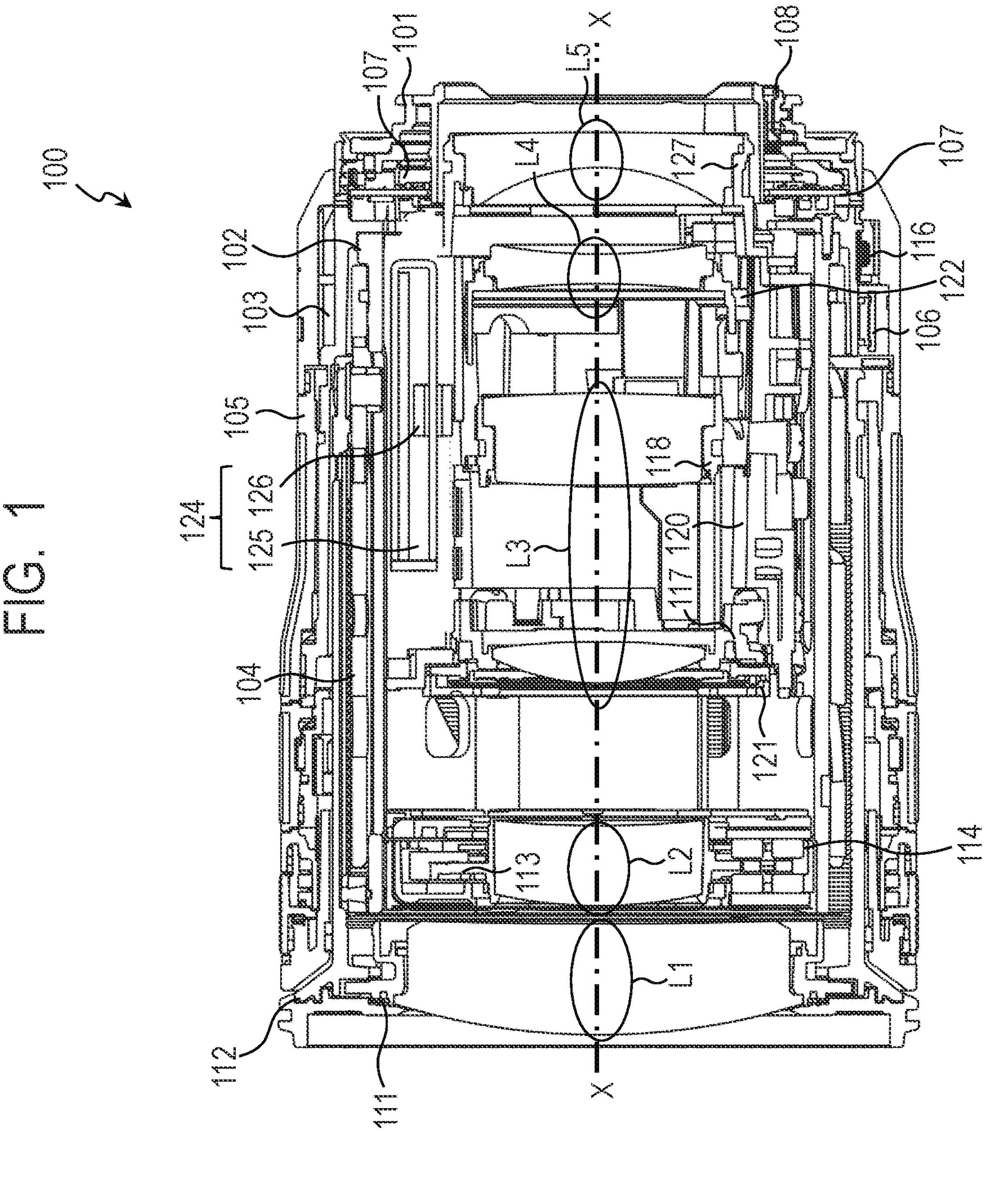
FIG. 1 is a sectional view of a lens barrel of the present invention in a state of being focused on an infinity at a wide-angle end.
Figure 2:
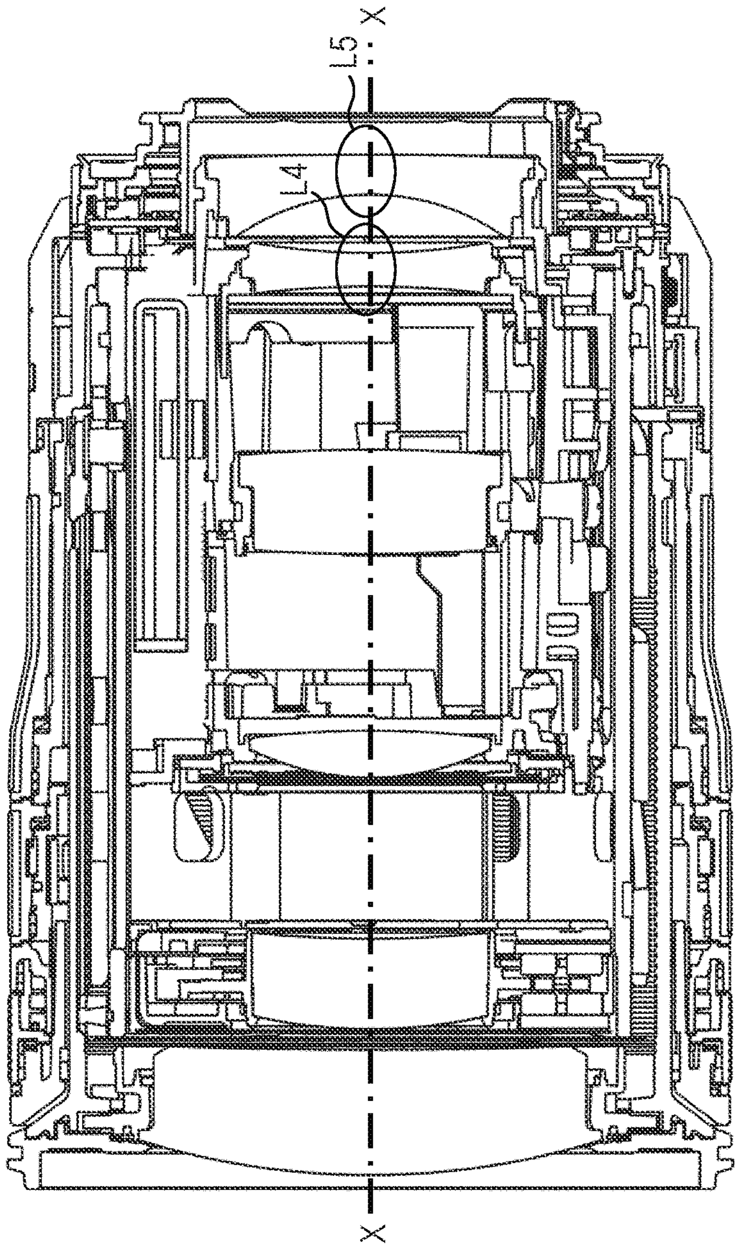
FIG. 2 is a sectional view of the lens barrel shown in FIG. 1 in a state of being focused on a close distance at the wide-angle end.
Figure 3:
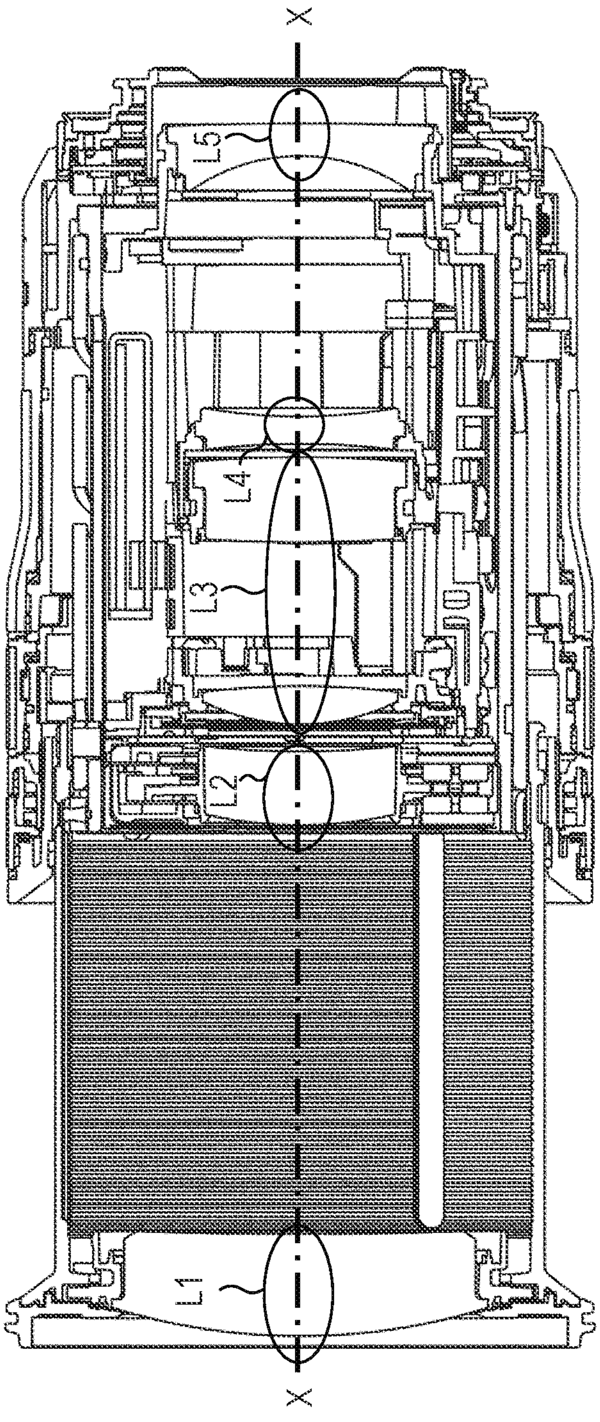
FIG. 3 is a sectional view of the lens barrel shown in FIG. 1 in a state of being focused on the infinity at a telephoto end.
Figure 4:
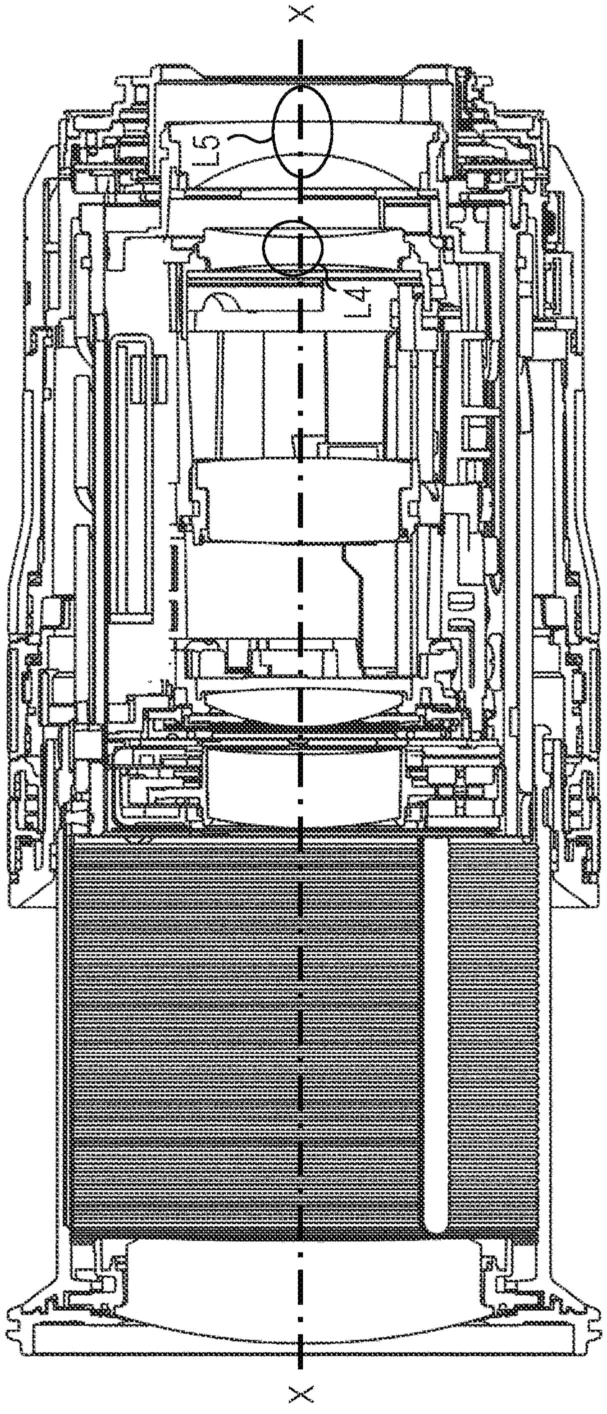
FIG. 4 is a sectional view of the lens barrel shown in FIG. 1 in a state of being focused on the close distance at the telephoto end.

A lens barrel according to an embodiment of the present invention will be described. FIG. 1 is a sectional view of the lens barrel of the present invention in a state of being focused on an infinity at the wide-angle end. FIG. 2 is a sectional view of the lens barrel shown in FIG. 1 in a state of being focused on the close distance at the wide-angle end. FIG. 3 is a sectional view of the lens barrel shown in FIG. 1 in a state of being focused on the infinity at a telephoto end. FIG. 4 is a sectional view of the lens barrel shown in FIG. 1 in a state of being focused on the close distance at the telephoto end. In the drawings, the line indicated by X-X represents an optical axis.

In FIG. 1, a mount 101 is a component fixed to a camera body (not shown). A guide barrel 102 is integrally fixed to the mount 101 together with a fixed barrel 103. A cam ring 104 is held on the outer periphery of the guide barrel 102 and is rotatably around the optical axis. The cam ring 104 is connected to a zoom ring 105, that is rotatably held on the outer periphery of the fixed barrel 103, by a key member (not shown), and is operable to integrally rotate by operating the zoom ring 105 from the outside.

The zoom sensor 106 as a first detecting unit is attached to the fixed barrel 103 and can electrically detect the rotation angle of the zoom ring 105. The zoom sensor 106 is electrically connected to a control board 107 arranged in the vicinity of the mount 101, and transmits a focal length information in zooming to a control circuit. A contact block 108 is electrically connected to the control board 107, and the control board 107 receives communication with and power supply from the camera body (not shown).

A lens barrel as a lens apparatus 100 has, in order from an object side to an image side, a first lens unit L1, a second lens unit L2, a third lens unit L3, a fourth lens unit L4 and a fifth lens unit L5. The first lens unit L1 is fixed to the first lens unit barrel 111. The first unit lens barrel 111 is fixed to a rectilinear barrel 112.

The second lens unit L2 is held by a second lens unit barrel 113. The second lens unit barrel 113 is held by a shift unit 114 while being movably in a plane orthogonal to the optical axis. The shift unit 114 includes an actuator for driving the second lens unit barrel 113, a sensor for detecting a driving amount, and the like, and the shift unit 114 is fixed to the guide barrel 102. The shift unit 114 is electrically connected to the control board 107. The control board 107 controls the driving of the second lens unit barrel 113 to correct a blurring based on a shaking signal detected by the sensor 116 for detecting a shaking mounted on the fixed barrel 103.

The third lens unit L3 is held by a 3A lens unit barrel 117 and a 3B lens unit barrel 118, and both are fixed to a third lens unit base barrel 120. An electromagnetic stop unit 121 is held by the third lens unit base barrel 120 and is electrically connected to the control board 107.

The fourth lens unit L4 as the second lens unit is held by the fourth lens unit barrel 122 (second holding member), and the fourth lens unit barrel 122 is held by the third lens unit base barrel 120 by guide bars 123*a* and 123*b* (FIG. 7) so as to be movable in the optical axis direction. The fourth lens unit L4 is a lens for a focus adjustment and is driven in the optical axis direction by a linear ultrasonic motor 124 held by the third lens unit base barrel 120.

The linear ultrasonic motor 124 comprises a fixed part 125 and a movable part 126, and drives the movable part 126 in the optical axis direction by ultrasonic vibration of a piezoelectric element, and is based on a well-known technique. The piezoelectric element is electrically connected to the control board 107 by a flexible printed board (not shown).

The fifth lens unit L5 as a first lens unit is held by a fifth lens unit barrel 127 as a first holding member.

The first lens unit L1, the third lens unit L3, and the fifth lens unit L5 are lens units configured to move for zooming, respectively, and the rectilinear barrel 112, the third lens unit base barrel 120, and the fifth lens unit barrel 127 are provided with a cam follower (not shown) fixed thereto, respectively. Each cam follower is engaged with a straight groove provided in the guide barrel 102 and a cam groove provided in the cam ring 104, and can move straight in the optical axis direction by rotating the cam ring 104.

Since the fourth lens unit L4 for focus adjustment is held by the third lens unit base barrel 120, the fourth lens unit L4 is driven in the optical axis direction by the linear ultrasonic motor 124 while being moved together with the third lens unit base barrel 120 by zooming.

Figure 5:
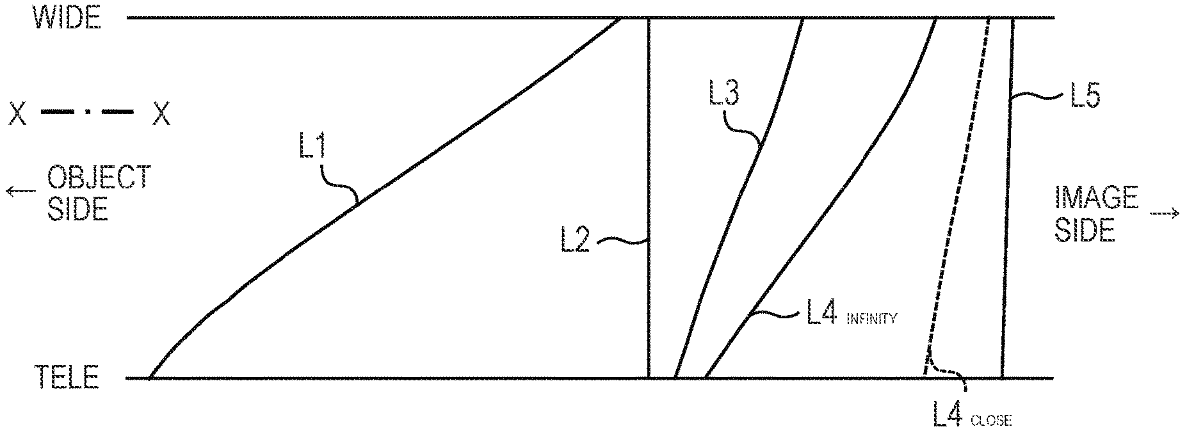
FIG. 5 is a diagram showing movement loci of each lens during zooming.

FIG. 5 is a diagram showing the movement loci of lens units by zooming.

FIG. 5 shows a movement locus from the wide angle end to the telephoto end with reference to the mount 101, and shows that L1, L3, and L5 move during zooming, and L2 does not move for zooming. $\mathbf{L4}_{Infinity}$ indicates a movement locus of the fourth lens unit L4 in a state of being focused at infinity, and $\mathbf{L4}_{close}$ indicates the movement locus in a state of being focused at a predetermined close distance.

The position information of the fourth lens unit L4 focused on each object distance from infinity to a closest distance in each focal length from the wide-angle end to the telephoto end is stored as data (table) in the control substrate 107 as controller. Based on the position information of the fourth lens unit L4 focused on each object distance and focal length information detected by the zoom sensor 106, the driving of the fourth lens unit barrel 122 by the linear ultrasonic motor 124 is controlled so as to follow the line shown in FIG. 5.

Next, the holding structure of the fourth lens unit barrel 122 will be described.

Figure 6:
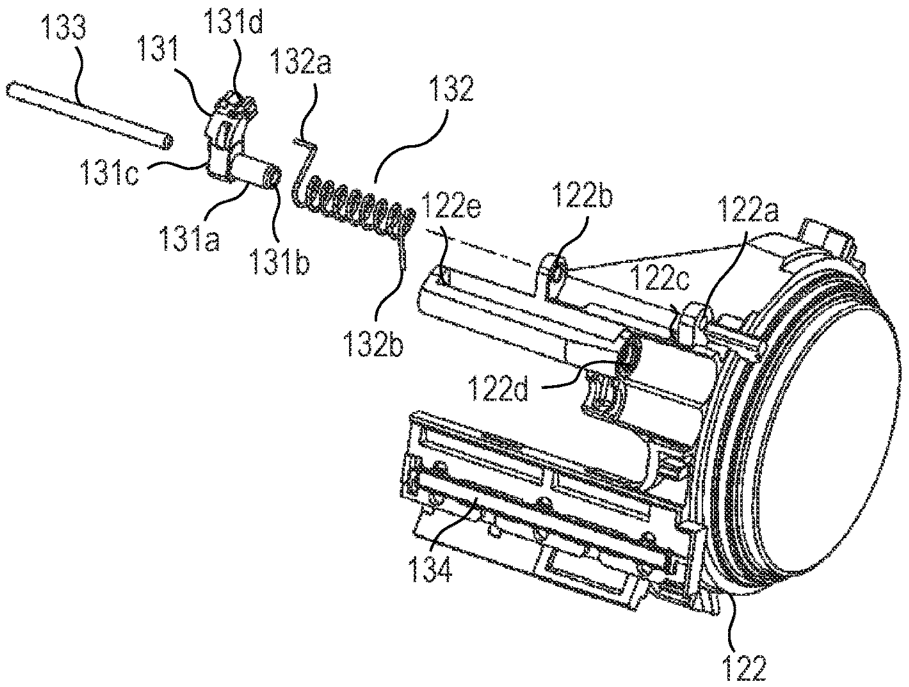
FIG. 6 is an exploded perspective view showing the structure of a rack holder of a fourth lens unit barrel.
Figure 7:
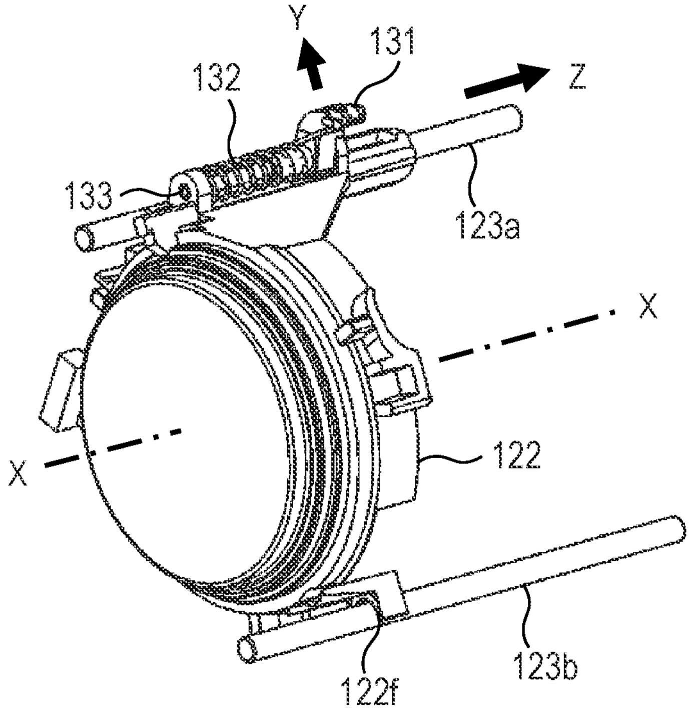
FIG. 7 is a perspective view showing a state in which a rack is assembled in the fourth lens unit barrel.

FIG. 6 is an exploded perspective view showing a structure of the rack holding portion of the fourth lens unit barrel 122. FIG. 7 is a perspective view showing the rack 131 assembled on the fourth lens unit barrel 122.

In FIGS. 6 and 7, the rack 131 (transmission member) is inserted between rack shaft holes 122*a*, 122*b* of the fourth lens unit barrel 122 with the shaft 131*a* of the rack 131 being passed through a rack spring 132 (biasing member). The rack guide shaft 133 is incorporated therein by being inserted through the rack shaft holes 122*a* and 122*b* and the sliding hole 131*b* of the rack 131. The end of the rack guide shaft 133 is press-fitted into the rack shaft hole 122*a* to be fixed to the fourth lens unit barrel 122 without backlash. As described above, the rack 131 is movable relative to the rack guide shaft 133 (fourth lens unit barrel 122) in the optical axis direction within a predetermined range, and is held rotatably about the rack guide shaft 133.

The rack 131 is always biased in the Z direction shown in FIG. 7 parallel to the optical axis by a biasing force of the rack spring 132, and the end 131*c* of the rack 131 is always brought into contact with the rack shaft hole 122*b* side of the fourth lens unit barrel 122. In other words, the fourth lens unit barrel 122 is biased toward the fifth lens unit barrel 127 (first holding member side) with respect to the rack 131 by the biasing force of the rack spring 132.

The hook portion 132*a* of the rack spring 132 is hooked on the rack 131, and the extension portion 132*b* on the opposite side is inserted into a spring-hooking hole 122*c* provided in the fourth lens unit barrel 122. With the configuration, the rack 131 is always biased in the Y direction shown in FIG. 7 with the rack guide shaft 133 as the rotation center. The V-groove portion 131*d* at the tip of the rack 131 is always engaged with a protrusion (not shown) provided on the movable part 126 of the linear ultrasonic motor 124. Thus, the driving force of the linear ultrasonic motor 124 is transmitted to the fourth lens unit barrel 122 without backlash due to the biasing force even if the component accuracy varies.

A scale 134 shown in FIG. 6 is a part of a second detecting unit, and is a member having a pattern continuous in the optical axis direction, and is adhered and fixed to a groove of the fourth lens unit barrel 122. This pattern is read by a position sensor (not shown), which is a part of the second detecting unit attached to the third lens unit base barrel 120 side to detect a relative position of the fourth lens unit barrel 122 relative to the third lens unit base barrel 120 in the optical axis direction. These are collectively referred to as the second detecting unit in this embodiment. The detection of the relative position of the fourth lens unit barrel 122 in the optical axis direction relative to the third lens unit base barrel 120 or the relative position of the fourth lens unit barrel 122 in the optical axis direction relative to the fifth lens unit barrel 127 may be directly detected. Alternatively, the position of the fourth lens unit barrel 122 (second holding portion) may be indirectly detected by a calculation based on a result of a detection of a rotation of the zoom ring.

Both ends of the guide bars 123*a* and 123*b* shown in FIG. 7 are fixed to the third lens unit base barrel 120. The guide bar 123*a* is inserted into sleeve holes 122*d* and 122*e* provided in the fourth lens unit barrel 122, and holds the fourth lens unit barrel 122 movably in the optical axis direction. The guide bar 123*b* engages the U-shaped groove 122*f* of the fourth lens unit barrel 122 to prevent the fourth lens unit barrel 122 from rotating about the guide bar 123*a*.

Next, a method of driving a focus lens according to the present invention will be described.

Figure 8:
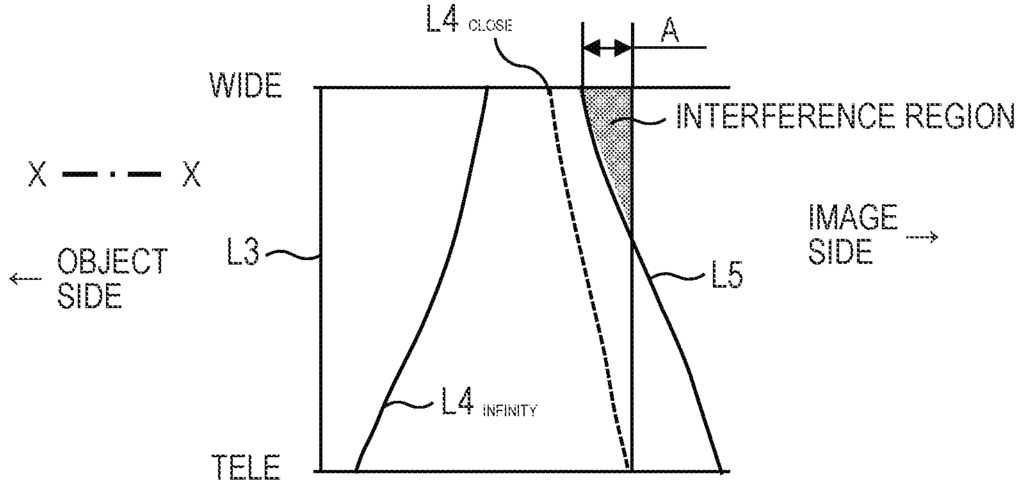
FIG. 8 is a diagram showing the movement loci of the fourth lens unit barrel and the fifth lens unit barrel with reference to the third lens unit base barrel.

FIG. 8 is a diagram showing movement loci of the fourth lens unit barrel 122 and the fifth lens unit barrel 127 at zoom positions from the wide angle end to the telephoto end with reference to the third lens unit base barrel 120. The distance in the optical axis direction indicated by the dashed line X between adjacent lines indicates the interval between the lens units. Therefore, a case where the lines cross each other indicates that the lens barrels interfere with each other.

The fourth lens unit barrel 122, which is a focus lens unit, is controlled to be driven by the linear ultrasonic motor 124 so as to follow the solid line shown as $L\mathbf{4}_{Infinity}$ in FIG. 8 in a case of being focused at infinity during zooming. In a case of being focused at an object at the closest distance, the drive control is performed so as to follow the broken line indicated as $L\mathbf{4}_{Close}$ in FIG. 8. Although not shown in the figure, loci of the intermediate focus positions between $L\mathbf{4}_{Infinity}$ and $L\mathbf{4}_{Close}$ are stored as data, and the driving control is performed according to the stored data based on the focal length information by the zoom sensor 106.

In FIG. 8, the fourth lens unit barrel 122 as the focus lens is electrically driven and controlled in accordance with zooming, but zooming operation is performed by a manual operation or by an external driving unit. Therefore, when zooming is performed at a high speed, since the driving speed of the focus lens is limited, the movement to an appropriate focus position changed depending on the zooming may not be completed in time. In a case of zooming by a conventionally existing built-in motor, the above-mentioned problem does not occur because the speed of the built-in motor is appropriately controlled.

In a case of the above-described lens, if the lens is zoomed to the wide-angle end state at a high speed when the lens is in a state of being focused at close distance at the telephoto end, the driving of the fourth lens unit barrel 122 may not be completed in time and the fourth lens unit barrel 122 and the fifth lens unit barrel 127 may interfere with each other. FIG. 8 shows the range of potential interference as an interference region. The maximum amount of interference is the amount of overlap in the optical axis direction between the position of the wide-angle end of the fifth lens unit barrel 127 (the line indicated by L5) and the position at the telephoto end of $L\mathbf{4}_{Close}$, and is the amount indicated by A in FIG. 8.

The amount of interference depends on the zooming speed and the speed of the actuator of the focus lens in the normal image pickup state. In a case of being applied to an interchangeable lens, when the interchangeable lens is disconnected from the camera at a state of being focused at close distance at the telephoto end and the power supply is cut off and then the lens is zoomed to the wide-angle end, an interference occurs by the amount of A shown in FIG. 8 because the focus lens cannot be driven.

Next, the movement of the fourth lens unit barrel 122 as the focus lens when it interferes with the fifth lens unit barrel 127 will be described.

Figure 9:
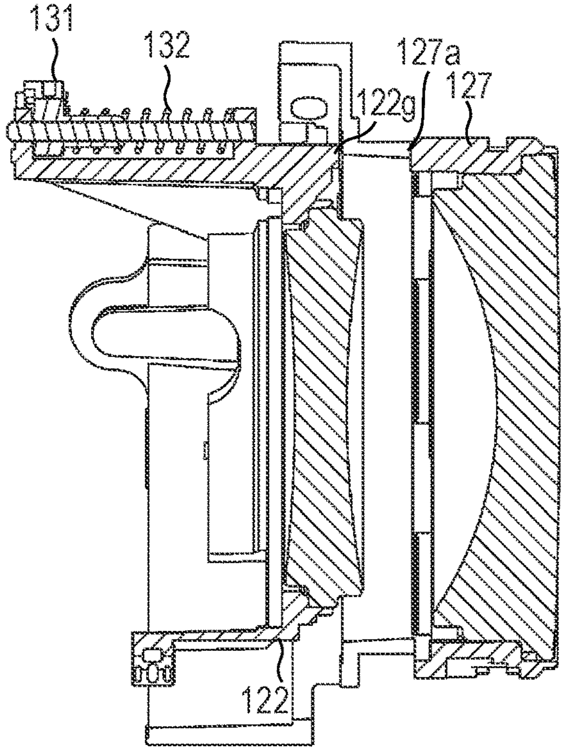
FIG. 9 is a sectional view showing a normal state of the fourth lens unit barrel and the fifth lens unit barrel.
Figure 10:
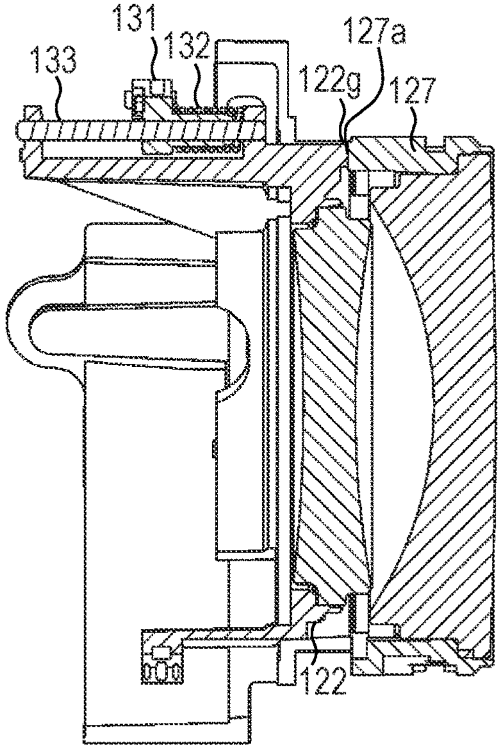
FIG. 10 is a sectional view showing an interference state between the fourth lens unit barrel and the fifth lens unit barrel.
Figure 11:
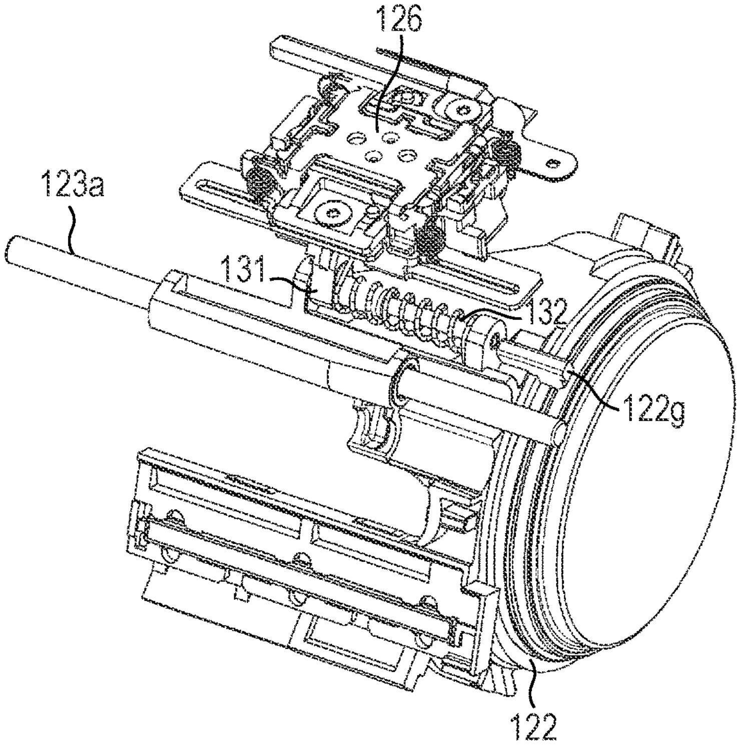
FIG. 11 is a perspective view showing the fourth lens unit barrel and the rack in the normal state.
Figure 12:
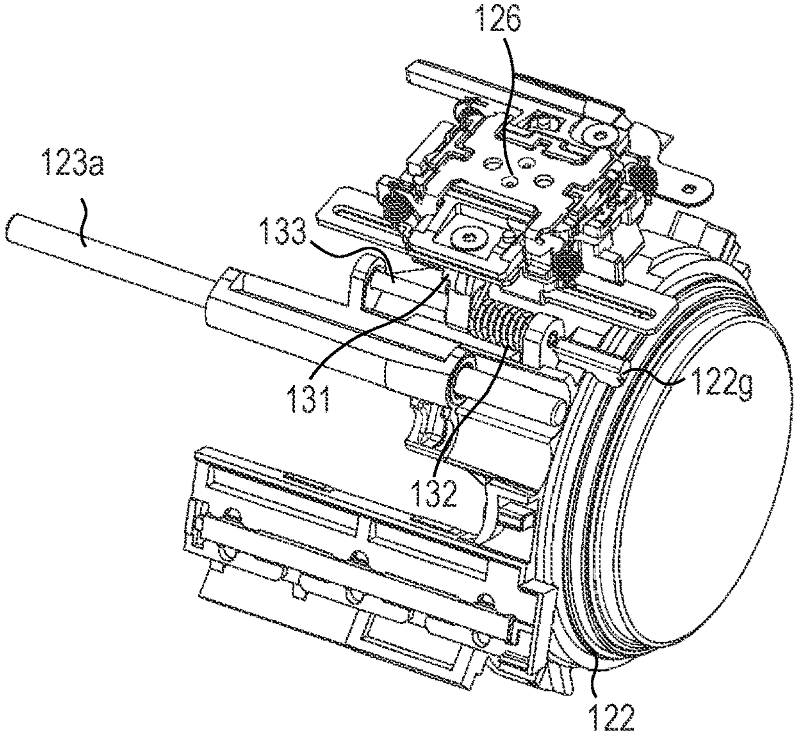
FIG. 12 is a perspective view showing the fourth lens unit barrel and the rack in the interference state.

FIGS. 9 and 10 are sectional views showing interference states between the fourth lens unit barrel 122 and the fifth lens unit barrel 127, with FIG. 9 showing the normal state and FIG. 10 showing the interference state. FIGS. 11 and 12 are perspective views showing the position of the rack 131 in the normal state and the interference state.

As shown in FIG. 10, when zooming is performed at a high speed from the telephoto end, or zooming is performed to the wide-angle end side in a state where the power source is cut off at a state of the telephoto end, the abutting part 122*g* of the fourth lens unit barrel 122 and the abutting part 127*a* provided in the fifth lens unit barrel 127 abut to each other. As a result, the fourth lens unit barrel 122 is pushed in the optical axis direction (the left side in FIGS. 9 and 10) by the fifth lens unit barrel 127. Then, since the rack 131 is held by the movable part 126 of the linear ultrasonic motor 124 and cannot be moved, the rack spring 132 is compressed, the rack guide shaft 133 slides with respect to the rack 131 (movable part 126), and the fourth lens unit barrel 122 moves in the optical axis direction together with the fifth lens unit barrel 127. Hereinafter, the compression of the rack spring 132 in this manner is referred to as a retraction, and a state thereof is also referred to as a retracted state. Therefore, even if an interference occurs, breakage of the lens barrel, the rack 131, or the linear ultrasonic motor 124 can be prevented. When the tracking of the focus lens is completed or the interference state is released by turning on the power again, the positional relationship between the fourth lens unit barrel 122 and the rack 131 is restored to the original normal state by the biasing force of the rack spring 132. It should be noted that the predetermined range in which the rack 131 and the fourth lens unit barrel 122 are relatively movable in the optical axis direction is configured to be larger than the maximum length A of the interference region AR4 in the optical axis direction, which will be described later. As described above, the fourth lens unit barrel 122 (the second holding member) can elastically retract by a moving amount of at least the maximum interference amount A from the rack 131 (transmission member) in the optical axis direction opposite to the fifth lens unit barrel 127 (first holding member).

In this embodiment, the rack guide shaft 133 for movably holding the rack 131 and the guide bar 122*a* for guiding the fourth lens unit barrel 123 in optical axis direction are composed of different components. As a result, the distance between the sleeve holes 122*d* and 122*e* holding the guide bar 123*a* of the fourth lens unit barrel 122 can be made larger than that in the prior art using the common shaft member. As a result, tilting of the fourth lens unit barrel 122 can be suppressed, and the optical performance can be further improved. In addition, since the force acting in the direction perpendicular to the axis can be reduced in the fitting portion between the two holes and the guide bar, prying caused by the friction force is less likely to occur, and smooth driving can be achieved.

Further, in this embodiment, the rack guide shaft 133 is held in the fourth lens unit barrel 122 separately from the rack 131. As a result, compared with the prior art in which the shaft of the rack member is extended forward and backward in the optical axis direction, the shaft does not protrude forward and backward from the lens holding member as the rack member moves. As a result, it is not necessary to provide an unnecessary space before and after the holding part of the rack member, and the entire lens barrel can be miniaturized. In the prior art, a space of the maximum interference amount Ain FIG. 8 is required forward and backward the rack holding portion. Therefore, the effect of carrying out the present invention increases in proportion to the amount of retraction.

In the conventional lens barrel, an optical design has been carried out so that no other lens is arranged in the driving range of the focus lens driven by electric power. In other words, the same amount of clearance between the focus lens and the other lens unit at the wide-angle end is provided as that at the telephoto end so as not to interfere with the moving range of the focus lens. Since the moving amount of the focus lens at the wide-angle end is often smaller than that at the telephoto end, an unnecessary clearance is often provided, and the total length of the lens is increased.

In the lens of the present invention in which an interference with respect to the focus lens is permitted when zooming at a high speed, so that unnecessary clearance between lens units is minimized to thereby make whole lens barrel compact. It would be necessary to provide an interval between the lens units by the amount of A shown in FIG. 8 in the conventional design, but the overall length can be shortened by the amount by adopting the configuration of the present invention.

On the other hand, consider a case where an interference occurs when the fourth lens unit barrel 122 is driven in a direction approaching the fifth lens unit barrel 127. The case, for example, corresponds to the following case where when focusing on from an object distance other than a close distance to the close distance in a zoom position on the telephoto end side from an intermediate zoom position, zooming is performed at a high speed toward the wide-angle end. The fourth lens unit barrel 122 collides with the fifth lens unit barrel while generating thrust in the direction approaching the fifth lens unit barrel 127. Therefore, the impact at the time of collision is large, and there are problems in terms of quality such as driving sound and driving accuracy.

Furthermore, a feedback control is generally used in a control of the linear ultrasonic motor, in which the position of the fourth lens unit barrel serving as the movable part is detected by a position sensor and control is performed based on a difference between a drive command position and the actual position. In the present embodiment, the feedback control is performed on the basis of the position deviation, but the control may be performed on the basis of the velocity, the acceleration, the deviation, differential, and integral of the acceleration, or a combination thereof.

In such a feedback control, a case where the fourth lens unit barrel 122 is stationary at a specific position and the fifth lens unit barrel 127 collides with the fourth lens unit barrel 122, corresponds to the state of evacuation as described above. That is, in a state where the fourth lens unit barrel 122 and the fifth lens unit barrel 127 are in contact with each other, the fourth lens unit barrel 122 and the fifth lens unit barrel 127 move while increasing the compression amount of the rack spring 132 without changing the position of the movable part 126 of the linear ultrasonic motor 124. In such case, the positions of the scale 134 and the fourth lens unit barrel 122 obtained from the position detection sensor (not shown) change according to the amount of retraction (the amount of compression of the rack spring 132), but the command position (the position to be obtained from the scale 134 and the position detection sensor (not shown)) to be used for the movable part 126 of the linear ultrasonic motor 124 to move the fourth lens unit barrel 122 does not change. Therefore, since the deviation between the command position and the actual position of the fourth lens unit barrel 122 becomes large, the control attempts to reduce the deviation by generating large thrust. However, since the fourth lens unit barrel 122 is in contact with the fifth lens unit barrel 127 and cannot move to a side where the distance from the fifth lens unit barrel 127 is further narrowed, oscillation may occur and a large collision sound or driving sound may be generated.

What kind of control is used to solve these problems, and how accuracy and quality can be improved while miniaturizing the product will be described below.

Figure 13:
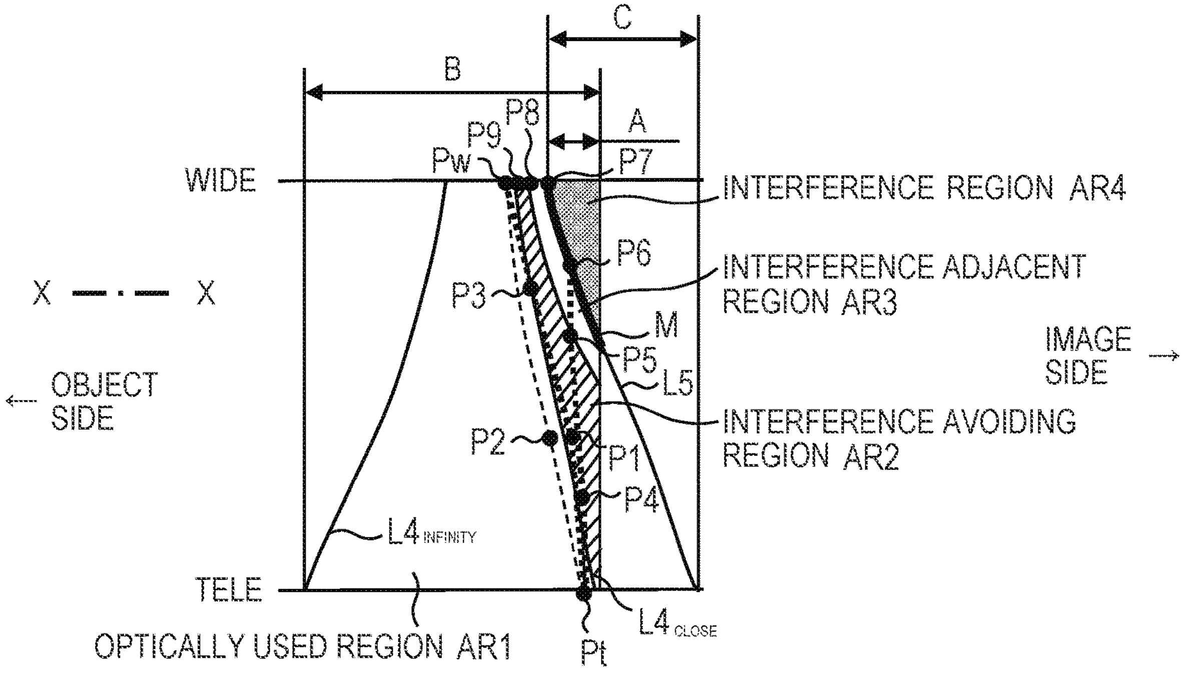
FIG. 13 is a diagram showing a region for switching control in the diagram of FIG. 8.

FIG. 13 is a diagram showing a region where the control of controller is changed at each position in the diagram of FIG. 8. FIG. 13 shows the movement loci of the fourth lens unit barrel 122 and the fifth lens unit barrel 127 with reference to the position of the third lens unit base barrel 120, and shows that the fourth lens unit barrel 122 and the fifth lens unit barrel 127 abut to each other to cause the retraction at the position in the interference region AR4. The range in which the fourth lens unit barrel 122 can be moved through being driven by the linear ultrasonic motor 124 is the range B shown in FIG. 13. In this embodiment, the range B is wider than the range optically necessary at the telephoto end. The range in which the fifth lens unit barrel 127 can move is the range C shown in FIG. 13 (only the range on the object side is shown), and overlaps with the range B in which the fourth lens unit barrel 122 can move each other in the range A which is a region of the interference with each other.

The regions AR1, AR2, AR3, and AR4 in FIG. 13 denote an optically used region, an interference avoiding region, an interference adjacent region, and an interference region, which will be described later. These regions are stored, in a controller for example, in a determination table as regions defined for the zoom positions and the focus positions. The optically used region AR1 is an area interposed between the line $L4_{Infinite}$ and the line $L4_{Close}$ in FIG. 13. The interference avoiding region AR2 is an area indicated by a hatched line interposed between the line $L4_{Close}$ and a solid curve in FIG. 13. The interference region AR4 is a region shown colored in FIG. 13, in which an image-side end of the interference region AR4 is the image-side end of the movable range of the fourth lens unit barrel 122 and an object-side end of the interference region AR4 is the movement locus of the fifth lens unit L5. The interference adjacent region AR3 is an area interposed between the interference avoiding region AR2 and the interference region AR4. The movable range C of the fifth lens unit barrel 127 and the movable range B of the fourth lens unit barrel 122 have an interference region (curve M which is the boundary on the object side of the interference region AR4) at which an interference with each other occurs.

A control method of controlling of driving of the fourth lens unit barrel by the controller where the control method is different depending on the regions will be described.

The optically used region AR1 is a driving region that is optically effective, and is a region in which a subject distance (object distance) specified by the product can be focused in a zoom variable range. That is, the optically used region AR1 is an area where an in-focus state on subject distances from the closest distance to the infinity can be obtained by moving the focus lens unit for any zoom positions from the wide-angle end to the telephoto end by moving the zoom lens unit.

In the optically used region AR1, a feedback control is performed where a setting is carried out in consideration of the quality of driving noise during zooming and the positional accuracy of driving. Unless a case where an interference occurs during high-speed zooming or power off, the control is normally performed in the optically used region. The command value in this region is a position determined based on the current zoom position and the previous object distance or the command value from the camera.

Next, the interference region AR4 will be described.

In FIG. 8 (FIG. 13), the interference region is, for example, the range expressed as the maximum interference amount A at the wide-angle end, and in this range, an interference between the fourth lens unit barrel 122 and the fifth lens unit barrel 127 actually occurs. That is, in the interference region, the movement limit of the fourth lens unit barrel 122 on the image side is restricted by the fifth lens unit barrel 127. Although shown as an area in FIG. 8 (FIG. 13), the fourth lens unit barrel 122 cannot be positioned within this area, but is actually positioned on the curve M that is the object-side boundary of the interference region AR4 shown in FIG. 13, and the rack spring 132 is in a compressed retracted state. That is, in the region of the interference region AR4, the fourth lens unit barrel 122 can only be positioned on the curve M, but at each zoom position of the interference region AR4, the rack 131 can be moved to a structural image-side end position by compressing the rack spring 132. The state in which the rack spring 132 is compressed corresponds to an area on the image side of the curve M in the interference region AR4.

In this state, the fourth lens unit barrel 122 cannot move to the image side beyond the curve M because the fifth lens unit barrel 127 is located. Therefore, since oscillation occurs in the feedback control in which the control is performed based on the deviation of the actual position relative to the command signal, control is performed by a feedforward controller. Alternatively, an upper limit value of the deviation input of the feedback control may be provided when driving in the interference region AR4. Alternatively, in the case of driving in the interference region AR4, the speed or acceleration of driving of the fourth lens unit barrel 122 in the feedback control may be controlled so as to be lower than that in the region other than the interference region AR4, or so as to have a lower maximum speed.

This range corresponds to cases in which the interference occurs due to high-speed zooming or when the power supply is turned off, etc., but as described above, the control is performed to move the fourth lens unit barrel 122 toward the optically used region AR1 side to enter the interference avoiding region AR2.

Next, the interference avoiding region AR2 will be described. As described above, in the interference avoiding region AR2, the control is performed so as not to enter the interference region AR4 as much as possible when zooming is performed at a high speed. In other words, even when a high-speed zooming is performed, the control is performed so as to avoid a collision (interference) between the fourth lens unit barrel 122 and the fifth lens unit barrel 127. The feedback gain of the feedback controller is controlled to be higher than that in the optically used region AR1, and/or the maximum speed and/or acceleration are increased.

The command position at this time becomes a boundary value of the optically used region AR1 corresponding to the current zoom position in the optically used region AR1, and when the fourth lens unit barrel 122 moves to the interference avoiding region AR2 from the optically used region AR1 by a high-speed zooming, the control is performed to return to the optically used region AR1 based on the command value. The same command value is obtained when the fourth lens unit barrel 122 is in the interference avoiding region AR2 when the power is turned on or when the fourth lens unit barrel 122 is moved from the interference region AR4 to the interference avoiding region AR2.

Finally, the control in the interference adjacent region AR3 will be described. The control in the interference adjacent region AR3 is different depending on whether the fourth lens unit barrel 122 is moved to the interference adjacent region from, the interference avoiding region AR2 (interference avoiding region side) or the interference region AR4.

The interference adjacent region AR3 is a region in which the control is performed so as to mitigate the sound of collision, the driving sound, and the degradation of quality of the picked up image when the fourth lens unit barrel 122 enters the interference region AR4 (curve M) even if controlling so as not to enter the interference avoiding region AR2 as much as possible. The control in the interference adjacent region AR3 is different depending on whether the fourth lens unit barrel 122 is moved to the interference adjacent region AR3 from, the interference region AR4 (via the interference region AR4) or from the interference avoiding region AR2 (via the interference avoiding region AR2).

First, when the fourth lens unit barrel 122 is moved from the interference avoiding region AR2 to the interference adjacent region AR, such case corresponding to a case of the above-described object, and as a concrete control, the feedback gain of the feedback controller may be made smaller than that in the optically used region AR1 or an upper limit value of deviation of the feedback control may be provided. Alternatively, a drive force for moving to the optically used region AR1 may be generated by the feedforward controller, or the drive force may be brought close to zero by the controller.

On the other hand, in a case where the fourth lens unit barrel 122 is moved to the interference adjacent region AR3 from the interference region AR4, the fourth lens unit barrel 122 is controlled to be driven to the boundary value of the optical region corresponding to the current zoom position or the command position inputted from the camera by the feedback controller. Alternatively, a drive force may be generated by the feedforward controller so that the fourth lens unit barrel 122 is moved to the region (for example, the optically used region AR1, the interference avoiding region AR2) on the optically used region side. If the fourth lens unit barrel 122 is in the interference adjacent region AR3 when the power supply is turned on, the same is true as described above.

By performing the above control, it becomes possible to provide a compact lens apparatus in which the moving range of a lens unit moved by use of an electric driving unit and the moving range of a lens unit moved manually or by external driving unit include a portion overlap each other and which achieves improvement in driving accuracy, improvement in driving sound quality and image pickup quality.

In order to make the above description easy to understand, the change of control when high-speed zooming is performed in the telephoto end will be described below by using some examples. For convenience, cases where the zoom ring 105 is rotated at a plurality of different speeds from the telephoto end to the wide-angle end will be described with reference to FIG. 13.

First, it is assumed that a high-speed zooming is performed at the position Pt at the telephoto end, and the zoom position and the focus position are moved to the position P1.

When the object distance does not change, the position should be moved to the position P2 originally. However, when the zooming speed is high, the driving speed of the movable part 126 (the fourth lens unit barrel 122) does not catch up and the position is changed to the position P1.

The control parameter of the feedback controller is changed since the fourth lens unit barrel 122 enters the interference avoiding region AR2 when the position reaches the position P1, to increase the focus speed to avoid interference, and the position is moved to the position P3, which means the position returns to the optically used region AR1, to reach the position Pw.

A case where a higher-speed zooming is performed will be described below.

Since a higher-speed zooming is performed from the position Pt of the telephoto end, the position is moved to the position P4 following a locus having a delay larger than the locus described above. Since the position enters the interference avoiding region AR2 from the position P4, the focus speed is increased to avoid entering the interference avoiding region AR 2. However, the driving speed of the movable part 126 (the fourth lens unit barrel 122) does not catch up with it and the position is moved to the position P5 to enter the interference adjacent region AR3. In the interference adjacent region AR3, the control is changed by reducing the feedback gain, setting an upper limit of deviation, switching from the feedback control to the feedforward control, or the like. Thus, the control is changed from giving priority to collision avoidance to giving priority to avoiding oscillation caused by the collision, to thereby reduce the collision sound and vibration. Under this state, the fourth lens unit barrel 122 and the fifth lens unit barrel 127 collide each other (position P6). The fourth lens unit barrel 122 is pushed by the fifth lens unit barrel 127 and moved to the position P7, and the zoom position reaches the wide-angle end.

Since this state is the interference state, a driving force for moving to the interference adjacent region AR3 is applied to the fourth lens unit barrel 122, and the fourth lens unit barrel 122 is moved to the position P8 to enter the interference avoiding region AR2. Further, the fourth lens unit barrel 122 is moved to the position P9 and enters the optically used region AR1, then the control parameter of the feedback control is changed or the feedback control is switched to the feed forward control, to thereby reach the position Pw which is the position originally intended by the zooming.

By detecting the zoom position and the focus position in this way, the region is determined by controller based on the zoom position and the focus position, and the control is changed based on the region obtained by the determination result. Thus, the interference between the fourth lens unit barrel 122 (the focus lens unit) and the fifth lens unit barrel 127 (the zoom lens unit) can be avoided as much as possible. If the collision cannot be avoided, oscillation can be avoided, driving sound (collision sound) and vibration at the time of collision can be reduced, and the quality of the captured image can be improved.

In the present embodiment, the changing of control method on the basis of a diagram determined based on the zoom position and the position of the focus lens in the optical axis direction (based on the detection result of the position detecting unit), but the present invention is not limited thereto.

For example, the region itself may be changed based not only on the position but also on the zoom speed (moving speed of the zoom lens unit). For example, when the zoom speed is high, the interference adjacent region AR3 may be made wider or the control parameter in the interference avoiding region AR2 may be changed according to the speed.

In the present embodiment, the control is changed depending on the optically used region AR1, the interference avoiding region AR2, the interference adjacent region AR3, and interference region AR4. However, the division of the regions is not limited thereto.

For example, whole region may be divided into two regions such as the interference region AR4 and an interference-free region as a region except the interference region AR4, and the control may be switched between the feedback control in the interference-free region and the feedforward control in the interference region AR4. In this case, the optically used region AR1, the interference avoiding region AR2, the and interference adjacent region AR3 are collectively treated as one region as the interference-free region. In this case, the feedback control is performed in the interference-free region including the optically used region AR1 and feedforward control is performed in the region where the interference occurs (the interference region AR4), to thereby prevent generation of the large driving sound or the collision sound due to oscillation at the time of interference.

Further, the region may be divided into more than four regions. The interference adjacent region may be divided into two regions and the control parameters may be changed, to thereby improve the quality further. That is, the quality can be further improved by changing the control based on two or more regions defined based on the relationship between the zoom position and the focus position.

In the present embodiment, as shown in the range A in FIG. 8, the interference region exists in the image plane side in the optical axis direction of the fourth lens unit barrel 122 that is electrically driven, but the interference region may exist in the object side of the fourth lens unit barrel 122 that is electrically driven. The interference region may exist on both the image plane side and the object side.

In this embodiment, an ultrasonic motor is employed to drive the focus lens, but the same effect can be achieved by employing a driving unit such as a step motor.

Figure 14:
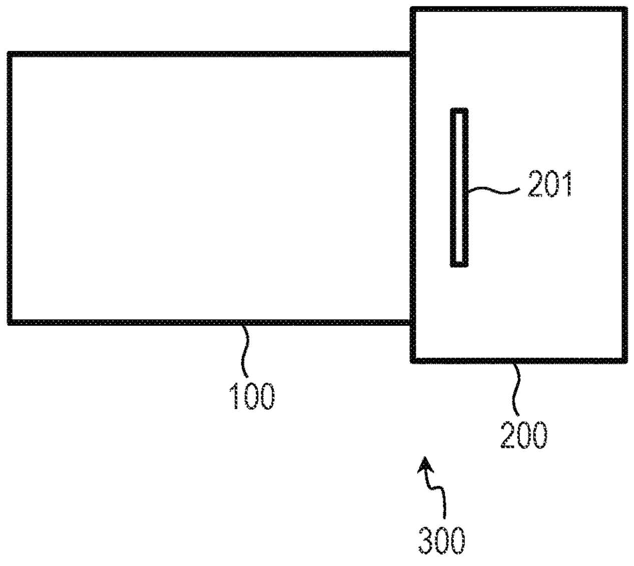
FIG. 14 shows an image pickup apparatus including a lens apparatus of the present invention.

An image pickup apparatus 300 (FIG. 14) having a lens apparatus 100 of the embodiment and a camera apparatus 200 including an image pickup element 201 for picking up an image formed by the lens apparatus 100 can realize an image pickup apparatus enjoying the effects of the present invention.

Other Examples

The present invention may also be implemented in a process in which a program implementing one or more of the functions of the embodiments described above is provided to a system or device via a network or storage medium and one or more processors in a computer of the system or device read and execute the program. It can also be realized by a circuit (for example, an ASIC) which realizes one or more functions.

Although the preferred embodiments of the present invention have been described above, the present invention is not limited to these embodiments, and various modifications and modifications can be made within the scope of the gist thereof.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-075917, filed Apr. 28, 2021, which is hereby incorporated by reference herein in its entirety.

What is claimed is:

1. A lens apparatus comprising:
- a first lens unit;
- a first lens barrel holding the first lens unit and movable in an optical axis direction;
- a second lens unit;
- a second lens barrel holding the second lens unit and movable in the optical axis direction;
- an actuator configured to move the second lens barrel in the optical axis direction;
- a controller configured to control the actuator by a feedback control;
- a first sensor that detects a position of the first lens barrel; and
- a second sensor that detects a relative position of the second lens barrel relative to the first lens barrel,
- wherein the first lens barrel is movable by a manual operation of a user or by an external actuator not included in the lens apparatus,
- wherein the controller determines, based on outputs of the first and second sensors, whether the first and second lens barrels are in:
  - a contact state in which the first and second lens barrels are in contact with each other; or
  - a noncontact state in which the first and second lens barrels are not in contact with each other,
- wherein in a case where the first and second lens barrels are determined to be in the contact state, the controller performs, in the feedback control of the actuator, any one among:
  - a control in which an upper limit value is set to a deviation to be input;
  - a control of the actuator with a speed lower than that in the noncontact state; and
  - a control of the actuator with an acceleration lower than that in the noncontact state, and
- wherein in a case where the first and second lens barrels are determined to be in the non-contact state, the controller performs the feedback control of the actuator differently from the feedback control of the actuator during the contact state.

2. The lens apparatus according to claim 1, wherein the controller controls the actuator by:
- a feedforward control in an overlapping region where the movable ranges overlap each other in the optical axis direction; and
- a feedback control in an effective region that is effective for picking up an image or an intermediate region between the overlapping region and the effective region.

3. The lens apparatus according to claim 1, wherein:
- the controller performs a determination, based on the outputs of the first and second sensors, of whether positions of the first and second lens barrels in an intermediate region between an overlapping region where the movable ranges overlap each other in the optical axis direction, and an effective region that is effective for picking up an image, are closer to a side of the effective region or closer to a side of an overlapping region where the movable ranges overlap each other in the optical direction; and
- the controller further changes the control of the actuator based on a result of the determination.

4. The lens apparatus according to claim 1, wherein:
- the controller performs a determination, based on the outputs of the first and second sensors, as to whether positions of the first and second lens barrels are in among an effective region that is effective for picking up an image, an overlapping region where the movable ranges overlap each other in the optical axis direction, and the intermediate region between the overlapping region and the effective region, and
- the controller further changes the control of the actuator based on a result of the determination.

5. The lens apparatus according to claim 4, wherein the controller further changes the control of the actuator depending on whether the second lens barrel changes from a side of the effective region to a side of the overlapping region or changes from the side of the overlapping region to the side of the effective region.

6. The lens apparatus according to claim 5, wherein a boundary between the side of the effective region and the side of the overlapping region in the intermediate region changes based on a movement speed of the first lens barrel.

7. The lens apparatus according to claim 5, wherein the controller further changes the control of the actuator in the intermediate region to increase an acceleration or a maximum speed of the actuator relative to that in the effective region.

8. An image pickup apparatus comprising:
- a lens apparatus; and
- an image pickup element for picking up an image formed by the lens apparatus,
- wherein the lens apparatus comprises:
  - a first lens unit;
  - a first lens barrel holding the first lens unit and movable in an optical axis direction;
  - a second lens unit;
  - a second lens barrel holding the second lens unit and movable in the optical axis direction;
  - an actuator configured to move the second lens barrel in the optical axis direction;
  - a controller configured to control the actuator by a feedback control;

a first sensor that detects a position of the first lens barrel; and a second sensor that detects a relative position of the second lens barrel relative to the first lens barrel, wherein the first lens barrel is movable by a manual operation of a user or by an external actuator not included in the lens apparatus, wherein the controller determines, based on outputs of the first and second sensors, whether the first and second lens barrels are in:

a contact state in which the first and second lens barrels are in contact with each other; or a noncontact state in which the first and second lens barrels are not in contact with each other, wherein in a case where the first and second lens barrels are determined to be in the contact state, the controller performs, in the feedback control of the actuator, any one among:

a control in which an upper limit value is set to a deviation to be input;

a control of the actuator with a speed lower than that in the noncontact state; and a control of the actuator with an acceleration lower than that in the noncontact state, and wherein in a case where the first and second lens barrels are determined to be in the non-contact state, the controller performs the feedback control of the actuator differently from the feedback control of the actuator during the contact state.

9. A method of controlling a lens apparatus by a controller of the lens apparatus, wherein the lens apparatus comprises:

a first lens unit;

a first lens barrel holding the first lens unit and movable in an optical axis direction;

a second lens unit;

a second lens barrel holding the second lens unit and movable in the optical axis direction;

an actuator configured to move the second lens barrel in the optical axis direction;

a controller configured to control the actuator by a feedback control;

a first sensor that detects a position of the first lens barrel; and a second sensor that detects a relative position of the second lens barrel relative to the first lens barrel, wherein the first lens barrel is movable by a manual operation of a user or by an external actuator not included in the lens apparatus, wherein the method comprises:

determining, with the controller, based on outputs of the first and second sensors, whether the first and second lens barrels are in:

a contact state in which the first and second lens barrels are in contact with each other; or a noncontact state in which the first and second lens barrels are not in contact with each other;

performing, with the controller, in the feedback control of the actuator, in a case where the first and second lens barrels are determined to be in the contact state, any one among:

a control in which an upper limit value is set to a deviation to be input;

a control of the actuator with a speed lower than that in the noncontact state; and a control of the actuator with an acceleration lower than that in the noncontact state; and performing, with the controller, in a case where the first and second lens barrels are determined to be in the non-contact state, the feedback control of the actuator differently from the feedback control of the actuator during the contact state.

10. A non-transitory medium storing a program executable by a processor to execute the method according to claim 9.

11. The lens apparatus according to claim 1, wherein, while the first and second lens barrels are in the contact state and the actuator is being driven, the output of the second sensor does not change.

12. The lens apparatus according to claim 1, further comprising:

a transmission member configured to move relative to the second holding member in in the optical axis direction and transmit a driving force of the driving unit to the second holding member; and a biasing member that biases the second holding member toward a side of the first holding member with respect to the transmission member.

13. The image pickup apparatus according to claim 8, wherein, while the first and second lens barrels are in the contact state and the actuator is being driven, the output of the second sensor does not change.

14. The method according to claim 9, wherein, while the first and second lens barrels are in the contact state and the actuator is being driven, the output of the second sensor does not change.

* * * * *